(12) United States Patent
Gaertner et al.

(10) Patent No.: US 10,399,547 B2
(45) Date of Patent: Sep. 3, 2019

(54) PRESSURE VARIATION DAMPER FOR A HYDRAULIC VEHICLE BRAKE SYSTEM, AND CORRESPONDING VEHICLE BRAKE SYSTEM

(71) Applicant: Robert Bosch GmbH, Stuttgart (DE)

(72) Inventors: Oliver Gaertner, Abstatt (DE); Alexander Geilfuss, Ilsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/520,037

(22) PCT Filed: Oct. 8, 2015

(86) PCT No.: PCT/EP2015/073248
§ 371 (c)(1),
(2) Date: Apr. 18, 2017

(87) PCT Pub. No.: WO2016/087094
PCT Pub. Date: Jun. 9, 2016

(65) Prior Publication Data
US 2017/0349152 A1    Dec. 7, 2017

(30) Foreign Application Priority Data

Dec. 4, 2014 (DE) .................. 10 2014 224 829

(51) Int. Cl.
*B60T 8/40* (2006.01)
*B60T 17/02* (2006.01)
(Continued)

(52) U.S. Cl.
CPC ............ *B60T 8/4068* (2013.01); *B60T 17/02* (2013.01); *B60T 17/04* (2013.01); *F16L 55/053* (2013.01); *B60T 8/4872* (2013.01)

(58) Field of Classification Search
CPC ...... B60T 8/4068; B60T 17/02; B60T 8/4291; B60T 8/4272; B60T 17/04; B60T 8/4872; F16L 55/053
(Continued)

(56) References Cited

U.S. PATENT DOCUMENTS 3,160,407 A * 12/1964 Vaugoyeau ............ B60G 11/27
267/35
5,058,961 A * 10/1991 Mergenthaler .......... B60T 8/341
303/115.4
(Continued)

FOREIGN PATENT DOCUMENTS

CN  102741102 A  10/2012
DE  39 12 937 A1  10/1990
(Continued)

OTHER PUBLICATIONS

International Search Report corresponding to PCT Application No. PCT/EP2015/073248, dated Jan. 26, 2016 (German and English language document) (5 pages).

*Primary Examiner* — Pamela Rodriguez
(74) *Attorney, Agent, or Firm* — Maginot, Moore & Beck LLP

(57) ABSTRACT

A pressure variation damper for a slip-regulated, hydraulic vehicle brake system includes a damper housing and a tubular damper element. The damper element is disposed in the damper housing and configured for elastic deformation. The damper element is subjected on an inside and/or on an outside to a fluid. Possible pressure variations of the fluid are to be damped. The damper element comprises a corrugation on the outside and a corrugation on the inside configured to reduce a change in a wall thickness of the damper element owing to the corrugation on the outside.

14 Claims, 2 Drawing Sheets

(51) Int. Cl.
*B60T 17/04* (2006.01)
*F16L 55/053* (2006.01)
*B60T 8/48* (2006.01)

(58) Field of Classification Search
USPC .......................... 303/87, 10; 138/26, 30, 31
See application file for complete search history.

(56) References Cited

U.S. PATENT DOCUMENTS

| | | | |
|---|---|---|---|
| 5,682,923 A * | 11/1997 | Goloff | F16L 55/053 138/26 |
| 5,803,555 A * | 9/1998 | Schaefer | B60T 8/368 138/30 |
| 6,076,557 A * | 6/2000 | Carney | F15B 1/103 138/30 |
| 6,164,336 A * | 12/2000 | Pasquet | B60T 8/4068 138/26 |
| 9,096,200 B2 * | 8/2015 | Zeoli | B60T 7/22 |
| 9,758,142 B2 * | 9/2017 | Doh | B60T 13/148 |
| 9,896,075 B2 * | 2/2018 | Her | B60T 8/4068 |
| 2012/0133201 A1 | 5/2012 | Zeoli et al. | |

FOREIGN PATENT DOCUMENTS

| | | |
|---|---|---|
| DE | 10 2005 009 658 A1 | 8/2006 |
| EP | 0 407 721 A1 | 1/1991 |
| JP | 6-40586 U | 5/1994 |
| JP | 11-304076 A | 11/1999 |

* cited by examiner

PRESSURE VARIATION DAMPER FOR A HYDRAULIC VEHICLE BRAKE SYSTEM, AND CORRESPONDING VEHICLE BRAKE SYSTEM

This application is a 35 U.S.C. § 371 National Stage Application of PCT/EP2015/073248, filed on Oct. 8, 2015, which claims the benefit of priority to Serial No. DE 10 2014 224 829.9, filed on Dec. 4, 2014 in Germany, the disclosures of which are incorporated herein by reference in their entirety.

The disclosure concerns a pressure variation damper for a slip-regulated, hydraulic vehicle brake system as well as a hydraulic vehicle brake system with such a pressure variation damper.

BACKGROUND

Slip-regulated vehicle brake systems usually comprise a piston pump as a hydraulic pump that produces pressure oscillations in transported brake fluid owing to the pulsating delivery manner thereof. For damping the pressure oscillations, it is known to connect a pressure variation damper to a pressure side of the piston pump that damps the pressure variations when transporting the brake fluid with the piston pump and as a result reduces the noise generation and the reaction on a master brake cylinder and thereby on a foot brake pedal or a hand brake pedal. Besides this, the damping of the pressure oscillations in the brake fluid improves the quality of the control of the slip regulation.

SUMMARY

The pressure variation damper according to the disclosure comprises for example a tubular or dome-shaped damper housing, in which a tubular and elastically deformable damper element is disposed. The damper element preferably comprises an open end and a closed end. The damper element is subjected internally and/or externally to a fluid, the possible pressure variations of which are to be damped. Such pressure variations are pressure oscillations, pressure pulsations and gradual or sudden pressure variations, wherein the list is by way of example and not exhaustive. According to the disclosure, the damper element comprises corrugations inside and outside, wherein the corrugations can be circumferential or helical, for example. The corrugation preferably comprises a round wave cross section, but angular wave cross sections are also possible, for example. Wave troughs on the inside are at the same height as wave peaks on the outside and vice-versa or in any case are disposed offset by less than a half-wavelength, so that a change in the wall thickness in a longitudinal direction of the damper element is reduced compared to a damper element that only has an external corrugation and does not have an inner corrugation.

Owing to the more uniform wall thickness, the damper element of the pressure variation damper according to the disclosure comprises a more uniform elasticity and enables a larger wave height of the corrugation on the outside with greater stiffness in wave troughs and/or higher elasticity at wave peaks of the corrugation on the outside of the damper element. In this way, the disclosure enables improved damping performance.

Advantageous embodiments and developments of the disclosure are provided by additional features of the descriptions, drawings, and claims. In a preferred embodiment of the disclosure, the damping element comprises an elastically variable wall thickness, is deformation-damping, which means that an elastic deformation of the damper element consumes energy and as a result deformations are damped, and preferably consists of an elastomer that has the two aforementioned properties.

A further object of the disclosure is a hydraulic vehicle brake system with a pressure variation damper of the type described above, which is preferably slip-regulated and comprises a hydraulic pump, for example a piston pump, and the pressure variation damper communicates with the pressure side thereof and damps pressure oscillations in the transported brake fluid.

BRIEF DESCRIPTION OF THE DRAWINGS

The disclosure is described in detail below using an exemplary embodiment represented in the drawing. In the figures.

DETAILED DESCRIPTION

Figure 1:
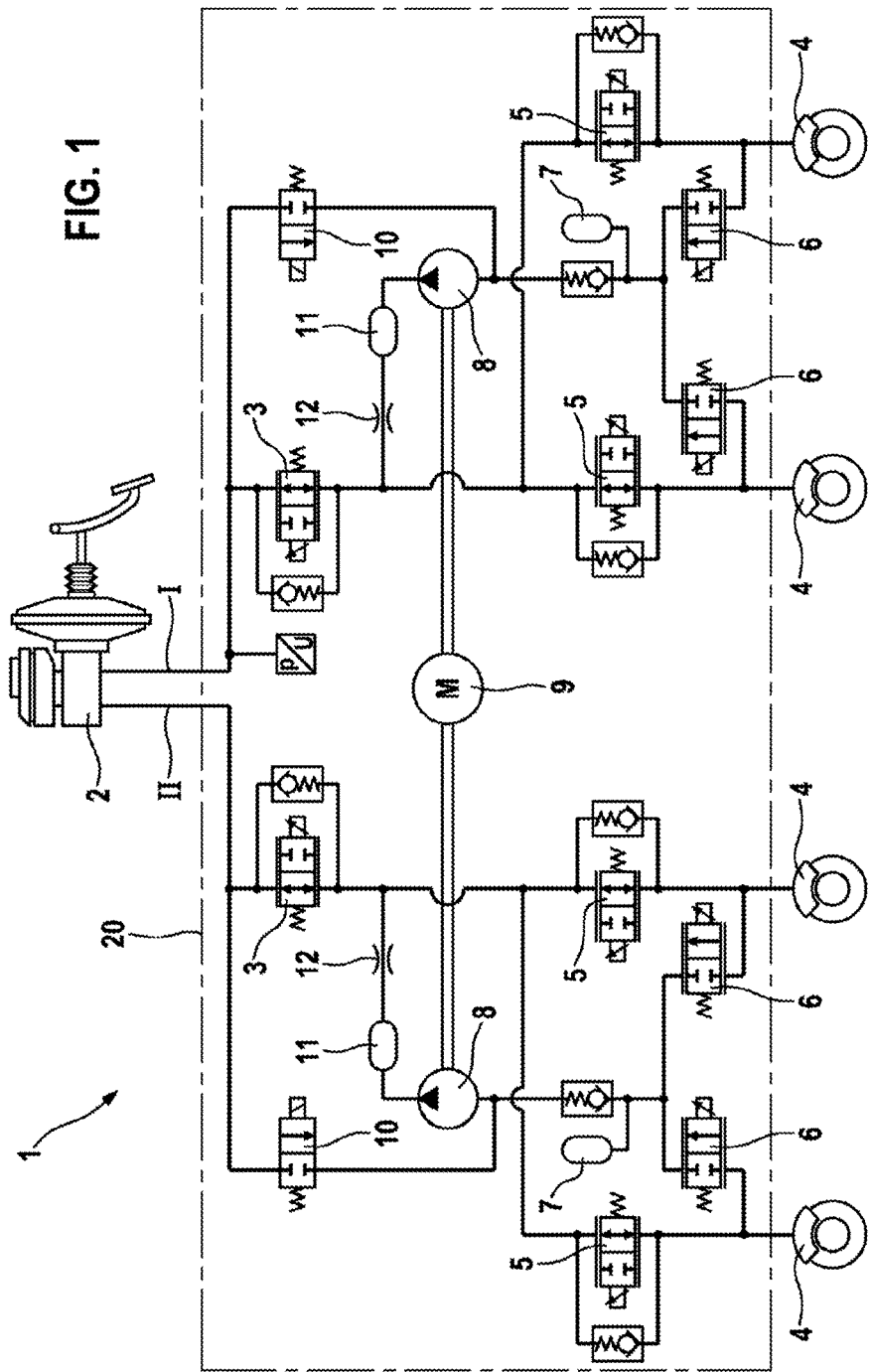
FIG. 1 shows a hydraulic circuit diagram of a vehicle brake system according to the disclosure with a pressure variation damper according to FIG. 2.

The hydraulic vehicle brake system 1 according to the disclosure represented in FIG. 1 comprises a dual circuit master brake cylinder 2 to which two brake circuits I, II are connected via an isolating valve 3 in each case. Wheel brakes 4 are hydraulically connected in parallel via inlet valves 5 to the isolating valves 3 and via outlet valves 6 to a hydraulic reservoir 7 and a suction side of a hydraulic pump 8. An inlet valve 5 and an outlet valve 6 are associated with each wheel brake 4. Each brake circuit I, II comprises a hydraulic reservoir 7 and a hydraulic pump 8, to which the wheel brakes 4 of the respective brake circuit I, II are connected in common via the outlet valves 6. In the embodiment that is represented and described, each brake circuit I, II comprises two wheel brakes 4, but this is not mandatory for the disclosure. The hydraulic pumps 8 are commonly driven with an electric motor. The suction sides of the hydraulic pumps 8 can be connected to the master brake cylinder 2 by suction valves 10. On the pressure sides of the hydraulic pumps 8, pressure variation dampers 11 and then chokes 12 are connected, via which the pressure sides of the hydraulic pumps 8 are connected to the brake circuits I, II between the isolating valves 3 and the inlet valves 5. The valves 3, 5, 6, 10 described are 2/2 solenoid valves and together with the hydraulic pumps 8 and the hydraulic reservoirs 7 form a slip regulating means 20 for the vehicle brake system 1. The pressure variation dampers 11 and the chokes 12 are also components of the slip regulating means 20. Such slip regulating means 20 of hydraulic vehicle brake systems and the function thereof are familiar to the person skilled in the art and are not described further here.

Figure 2:
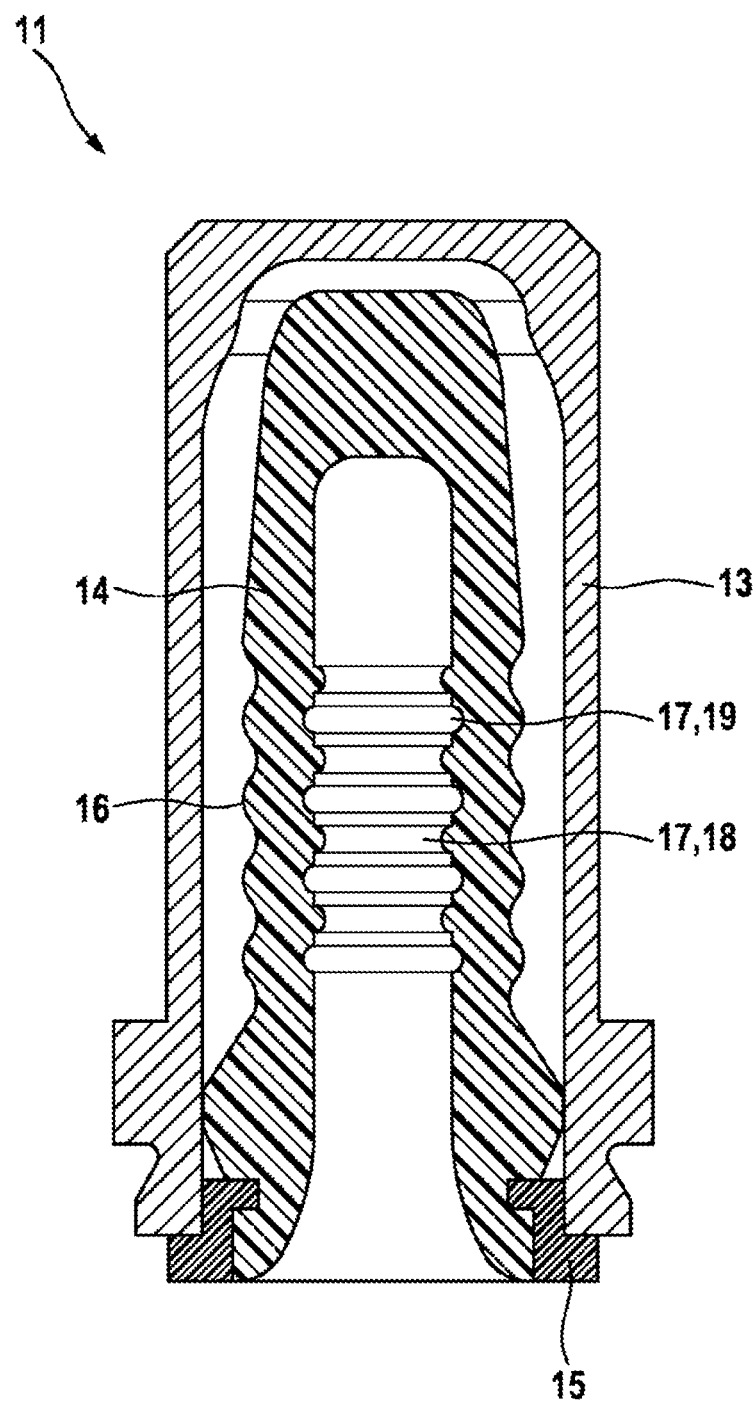
FIG. 2 shows an axial section of a pressure variation damper according to the disclosure.

FIG. 2 shows a pressure variation damper 11 according to the disclosure. The pressure variation damper 11 comprises a tubular damper housing 13 with an open end and a closed end, which can also be considered to be dome-shaped. A tubular damper element 14 is disposed in the damper housing 13, which also has an open end and a closed end, which tapers slightly towards the closed end thereof, and the closed end of which is disposed in the closed end of the damper housing 13 and the open end of which is fixed in the open end of the damper housing 13 by means of an annular socket 15.

The damper element 14 consists of an elastomer that can be foamed. The damper element 14 is elastically deformable, wherein the wall thickness thereof is also elastically variable. In this case, owing to the material properties of the elastomer of which it consists, the damper element 14 is deformation-damping, i.e. it consumes energy during an elastic deformation, whereby it damps pressure variations of a fluid, which is brake fluid in the embodiment.

On its outside the damper element 14 encloses a gas, for example air, between itself and the damper housing 13, on its inside it communicates with the pressure side of the hydraulic pump 8.

The damper element 14 is thick-walled, which means a wall thickness in the ratio of at least 0.5 to an internal diameter of the damper element 14 or of at least 0.25 to an external diameter of the damper element 14 or of at least 0.05 to a length of the damper element.

The damper element 14 comprises a circumferential corrugation 16, 17 both on the outside and on the inside, the corrugation 16 on the outside of the damper element 14 comprising a sinusoidal cross section. On the inside the damper element 14 comprises wave peaks 18 and wave troughs 19. The wave peaks 18 are circumferential beads within the damper element 14 with a curved cross section for example, and the wave troughs 19 are circumferential grooves within the damper element 14, also with a circular arc-shaped cross section. The wave peaks 18 on the inside of the damper element 14 are disposed at the same height as the wave troughs of the corrugation 16 on the outside of the damper element 14 and the wave troughs 19 on the inside are disposed at the same height as the wave peaks of the corrugation 16 on the outside of the damper element 14. The same height means radial planes of the damper element 14. A height or depth of the wave peaks 18 and wave troughs 19 on the inside is smaller, i.e. the corrugation 17 on the inside of the damper element 14 is smaller than the corrugation 16 on the outside. In the region of the corrugations 16, 17 on the outside and the inside of the damper element 14, the wall thickness of the damper element 14 thus changes in the longitudinal direction thereof, but owing to the corrugation 17 on the inside in addition to the corrugation 16 on the outside of the damper element 14, a change in the wall thickness in the longitudinal direction of the damper element 14 is smaller than it would be without the corrugation 17 on the inside. It is also possible to provide either only wave peaks 18 or only wave troughs 19 as the corrugation 17 on the inside (not shown).

The invention claimed is:

1. A pressure variation damper for a slip-regulated, hydraulic vehicle brake system, comprising:
    a damper housing; and
    a tubular damper element disposed in the damper housing, configured for elastic deformation, and defining a longitudinal axis,
    wherein the damper element is subjected on an inside and/or on an outside to a fluid,
    wherein possible pressure variations of the fluid are to be damped,
    wherein the damper element comprises a corrugation on the outside and a corrugation on the inside configured to reduce a change in a wall thickness of the damper element owing to the corrugation on the outside,
    wherein the corrugation on the outside defines first wave troughs and first wave peaks having a wavelength,
    wherein the corrugation on the inside defines second wave troughs and second wave peaks, and
    wherein the second wave troughs are offset along the longitudinal axis relative to the first wave peaks by less than half of the wavelength.

2. The pressure variation damper as claimed in claim 1, wherein the damper element further comprises an open end and a closed end.

3. The pressure variation damper as claimed in claim 1, wherein the damper element is thick-walled.

4. The pressure variation damper as claimed in claim 1, wherein the wall thickness is non-uniform.

5. The pressure variation damper as claimed in claim 4, wherein the wall thickness of the damper element in a region of the first wave peaks on the outside is greater than the wall thickness of the damper element in a region of the first wave troughs on the outside.

6. The pressure variation damper as claimed in claim 1, wherein the wall thickness is elastically variable.

7. The pressure variation damper as claimed in claim 1, wherein the damper element is deformation-damping.

8. The pressure variation damper as claimed in claim 1, wherein the damper element further comprises an elastomer.

9. The pressure variation damper as claimed in claim 1, wherein
    the second wave troughs are aligned with the first wave peaks along the longitudinal axis.

10. The pressure variation damper as claimed in claim 9, wherein the second wave peaks are aligned with the first wave troughs along the longitudinal axis.

11. A hydraulic vehicle brake system, comprising:
    a pressure variation damper including:
        a damper housing; and
        a tubular damper element disposed in the damper housing, configured for elastic deformation, and defining a longitudinal axis,
        wherein the damper element is subjected on an inside and/or on an outside to a fluid,
        wherein possible pressure variations of the fluid are to be damped, and
        wherein the damper element comprises a corrugation on the outside and a corrugation on the inside configured to reduce a change in a wall thickness of the damper element owing to the corrugation on the outside,
        wherein the corrugation on the outside defines first wave troughs and first wave peaks having a wavelength,
        wherein the corrugation on the inside defines second wave troughs and second wave peaks, and
        wherein the second wave troughs are offset along the longitudinal axis relative to the first wave peaks by less than half of the wavelength.

12. The hydraulic vehicle brake system as claimed in claim 11, further comprising:
    a hydraulic pump.

13. The hydraulic vehicle brake system as claimed in claim 11, wherein
    the second wave troughs are aligned with the first wave peaks along the longitudinal axis.

14. The hydraulic vehicle brake system as claimed in claim 13, wherein the second wave peaks are aligned with the first wave troughs along the longitudinal axis.

* * * * *